Feb. 7, 1933.   A. W. KIMBELL   1,896,868
WEARING APPAREL AND SNAP FASTENER THEREFOR
Filed Aug. 1, 1931
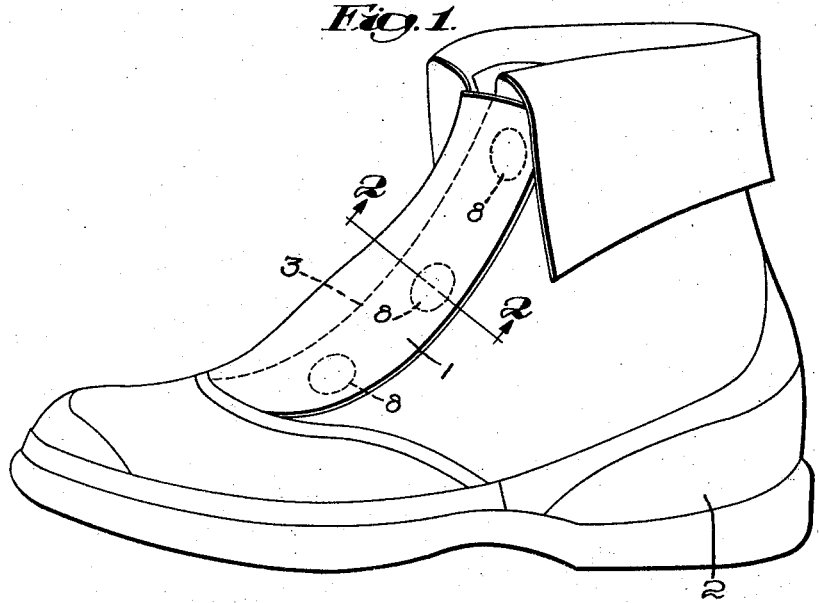
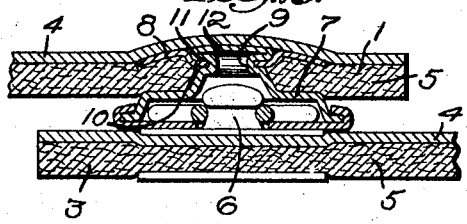
Inventor:
Arthur W. Kimbell
by Emery, Booth, Varney & Townsend
Attys Patented Feb. 7, 1933

1,896,868

UNITED STATES PATENT OFFICE

ARTHUR W. KIMBELL, OF NEWTON CENTER, MASSACHUSETTS, ASSIGNOR TO UNITED-CARR FASTENER CORPORATION, OF CAMBRIDGE, MASSACHUSETTS, A CORPORATION OF MASSACHUSETTS

WEARING APPAREL AND SNAP FASTENER THEREFOR

Application filed August 1, 1931. Serial No. 554,436.

My invention aims to provide improvements in articles of wearing apparel and separable snap fastening means for use therewith.

In the drawing which illustrates a preferred embodiment of my invention:—

Figure 1 is a perspective view of an overshoe showing the snap fastener means in dotted lines; and Fig. 2 is an enlarged section on the line 2—2 of Figure 1, the stud member being shown in elevation.

My invention, as illustrated by the drawing, is particularly, though not exclusively, useful in connection with overshoes having an opening in the instep adapted to be closed by separable snap fastener members attached to overlapping portions of the overshoe adjacent to the opening. I am aware that snap fastener members have been used for this purpose heretofore, but the snap fastener elements on the upper overlapping portion were attached in such a manner that cap portions were exposed at the outer surface of the material. For various reasons, it is desirable to provide overshoes which present smooth surfaces and with the fastener means concealed. Therefore, I have illustrated one manner in which this purpose may be conveniently and desirably accomplished.

While the snap fastening means may include a stud member and a socket member and preferably several cooperating snap fastener members, as shown in Figure 1, I have shown one desirable combination, as particularly illustrated in Fig. 2. The upper overlapping portion 1 of the overshoe 2, as well as the lower overlapping portion 3, comprises two layers of material as best illustrated in Fig. 2. The outer layer 4 is preferably a thin layer of rubber, whereas the inner layer 5 may be of rubberized fabric or any other suitable material. In the particular combination illustrated I have shown a stud member 6 suitably attached to the lower overlapping portion 3 and a cooperating snap fastener socket 7 attached to the underneath side of the upper overlapping portion 1, thereby to receive the stud, as shown in Fig. 2. The socket is preferably attached by means of a plate 8 located between the material 4 and the material 5, in combination with a rivet 9 extending through the material 5 from the socket 7. The plate 8 has a central depressed portion 10 having an aperture 11 therethrough and the rivet 9 has a closed end 12 which passes through the aperture 11 and is upset within the depressed portion 10 in such a manner that it presents a substantially continuous surface with the plate 8.

It is particularly desirable to provide attaching means which will present a relatively smooth imperforate surface so that when the layer of rubber 4 is vulcanized to the layer of material 5 the outer surface of the rubber material will remain smooth and thereby present a neat appearance to the finished article. If, for instance, an open ended tubular rivet is used an aperture would be presented into which some of the rubber covering material 4 would flow during the vulcanizing process, thereby providing an indentation or a hole in the outer surface. It will readily be understood that such a structure would be objectionable and, therefore, the importance of my invention is apparent.

It should be understood that my invention is not limited to the particular arrangement of the fastener members illustrated and described, because the same type of attachment might be used in connection with securing a stud member to the upper overlapping portion 1 for cooperation with a socket secured to the lower overlapping portion 3. Furthermore, my invention is useful in connection with other articles having a rubber covering material at the outer surface and which contemplate the use of snap fasteners to be concealed. Therefore, I do not wish to be limited to the particular structure illustrated and described because my invention is best set forth in the following claims.

1. A snap fastener member installation comprising, in combination, a carrying medium, a snap fastener member and attaching means comprising an apertured member located at the opposite side of the carrying medium from that side at which the snap fastener member is located and rivet means extending from the snap fastener member through the carrying medium and the apertured member, said rivet means having its ends flattened so as to provide a smooth substantially continuous surface substantially flush with the surface of the apertured member against which it is secured and a covering material vulcanized to the carrying medium at that side at which the apertured member is located to conceal the attaching means from view, and said smooth surface of the attaching means preventing objectionable irregularities in the surface of the vulcanized material.

2. A snap fastener member installation comprising, in combination, a carrying medium, a snap fastener member, attaching means comprising a part located at that side of the carrying medium opposite the side at which the fastener member is located and means passing through the carrying medium and securing the said part and fastener member to the carrying medium, said part presenting, when attached, a smooth substantially continuous surface throughout which is substantially flush with the surface of the carrying medium and a vulcanized covering material covering that side of the carrying medium at which the said part is located and vulcanized thereto thereby to conceal said part while being supported by the smooth surface of the said part and attaching means during the vulcanizing process in such a manner as to prevent objectionable irregularities in the surface of the vulcanized material.

In testimony whereof, I have signed my name to this specification.

ARTHUR W. KIMBELL.